US 8,364,706 B2

(12) United States Patent
Simpson

(10) Patent No.: US 8,364,706 B2
(45) Date of Patent: Jan. 29, 2013

(54) SYSTEM AND METHOD FOR INFORMATION IDENTIFICATION

(75) Inventor: Todd Garrett Simpson, Calgary (CA)

(73) Assignee: ZI Corporation of Canada, Inc., Calgary, Alberta (CA)

( * ) Notice: Subject to any disclaimer, the term of this patent is extended or adjusted under 35 U.S.C. 154(b) by 1165 days.

(21) Appl. No.: 10/561,380

(22) PCT Filed: Jun. 18, 2004

(86) PCT No.: PCT/CA2004/000897
§ 371 (c)(1),
(2), (4) Date: Aug. 28, 2006

(87) PCT Pub. No.: WO2004/111871
PCT Pub. Date: Dec. 23, 2004

(65) Prior Publication Data
US 2007/0094718 A1    Apr. 26, 2007

Related U.S. Application Data

(60) Provisional application No. 60/479,070, filed on Jun. 18, 2003.

(51) Int. Cl.
*G06F 7/00* (2006.01)
*G06F 17/30* (2006.01)

(52) U.S. Cl. ........ 707/771; 707/749; 707/750; 707/751; 707/767; 707/769; 707/778; 707/780; 707/E17.016; 707/E17.017; 455/566; 455/95; 455/26.1; 455/465; 455/419; 345/156; 345/168; 345/169; 345/173; 345/179; 715/259; 715/255; 715/260; 715/264; 715/265; 726/26; 726/27

(58) Field of Classification Search ................ 726/9
See application file for complete search history.

(56) References Cited

U.S. PATENT DOCUMENTS

| 5,818,437 | A | 10/1998 | Grover et al. |
| 5,911,485 | A * | 6/1999 | Rossmann ............... 341/22 |
| 5,953,541 | A | 9/1999 | King et al. |
| 6,223,059 | B1 * | 4/2001 | Haestrup ............... 455/566 |
| 6,646,573 | B1 * | 11/2003 | Kushler et al. ............... 341/28 |
| 6,823,183 | B2 * | 11/2004 | Narusawa ............... 455/412.1 |
| 6,983,310 | B2 * | 1/2006 | Rouse et al. ............... 709/206 |
| 7,515,941 | B2 * | 4/2009 | Kwon et al. ............... 455/564 |
| 2002/0019731 | A1 | 2/2002 | Masui et al. |
| 2002/0198027 | A1 | 12/2002 | Rydbeck |
| 2006/0247915 | A1 * | 11/2006 | Bradford et al. ............... 704/1 |

FOREIGN PATENT DOCUMENTS

| CN | 1330501 A | 1/2002 |
| EP | 1006704 A2 | 6/2000 |
| EP | 1031913 A2 | 8/2000 |
| EP | 1259051 A1 | 11/2002 |
| GB | 2197097 A | 5/1988 |
| JP | 200305702 | 11/2000 |
| JP | 2001067351 | 3/2001 |
| JP | 2001325252 | 11/2001 |
| JP | 2003015806 | 1/2003 |

* cited by examiner

*Primary Examiner* — Nathan Flynn
*Assistant Examiner* — Bryan Wright
(74) *Attorney, Agent, or Firm* — Michael A. Glenn; Glenn Patent Group

(57) ABSTRACT

A system and a method of retrieving information is described. In a system according to the invention, software modules may be used to provide the user with information that is most likely to be the information desired.

7 Claims, 2 Drawing Sheets

SYSTEM AND METHOD FOR INFORMATION IDENTIFICATION

CROSS-REFERENCE TO RELATED APPLICATION

This application claims the benefit of priority to pending U.S. provisional patent application Ser. No. 60/479,070 filed on Jun. 18, 2003.

FIELD OF THE INVENTION

The invention relates to systems and methods of retrieving information. The invention may be particularly useful on small computing devices, such as mobile personal appliances like cellular telephones (cell phones) or personal digital assistants (PDAs).

BACKGROUND OF THE INVENTION

Computers have enabled people to rapidly access a large amount of data. The hardware and software that comprise a computer have evolved to a level that may result in providing a user with an overwhelming amount of information. The amount of information provided to a user may make it difficult for the user to identify a desired piece of information. Efforts to categorize and organize the information provided to a user have been made, and many of these efforts have resulted in systems and methods which assist the user in identifying desired information. Such systems and methods often rely on the speed of the processors or the manner in which the software code is executed to provide the information in a logical manner within a time frame that is acceptable to the typical user.

SUMMARY OF THE INVENTION

The invention may be an information identification system which has software modules and hardware capable of being controlled by the software modules to identify information that may be desired by a user. The software modules may include a platform-framework software module, a data-type software module, a service-descriptor software module, a first information-search software module, and a second information-search software module. The hardware in a system according to the invention may include a processor capable of executing the software modules, or more than one processor, each capable of executing at least one of the software modules. The system may also include a user interface that is capable of providing information to the user.

A method according to the invention may receive input from a user, identify types of data that might be returned to the user, identify valid actions corresponding to each type of data, identify a first set of information corresponding to a first identified valid action, identify a second set of information corresponding to a second identified valid action, and provide sets of information to the user. The types of data may be identified from one or more lists of data types, and the valid actions may be identified from one or more lists of actions.

DRAWINGS

For a fuller understanding of the nature and objects of the invention, reference should be made to the following detailed description taken in conjunction with the accompanying drawings, in which.

DETAILED DESCRIPTION

The present invention may include a system having one or more processors capable of executing software modules. The system may include one or more of the following software modules: (a) a platform-framework software module 10, (b) a data-type software module 13, (c) a service-descriptor software module 16, (d) a first information-search software module 16 and (e) a second information-search software module 22. Each of these software modules is described in more detail below.

The platform-framework software module 10 may have executable instructions to receive input from a user. For example, the input may be a signal resulting from the user pressing a key on a cell phone key pad the key having the number "2" followed by the key having the number "2." The user may or may not intend to enter the number "22" by pressing the key in such a fashion. For example, the key having the number "2" may represent letters or punctuation. In one common arrangement, the key having the number "2" also represents the letters "A", "B" and "C." In such a situation, pressing the key having the "2" followed by a second press of that key may represent "AB" rather than "22". Such might be the case if the user is attempting to enter the words "Abraham Lincoln". It should be noted that the user may be trying to enter a combination of numbers (e.g. "22"), letters (e.g. "AB", or a combination of letters and numbers (e.g. "A2").

Figure 1:
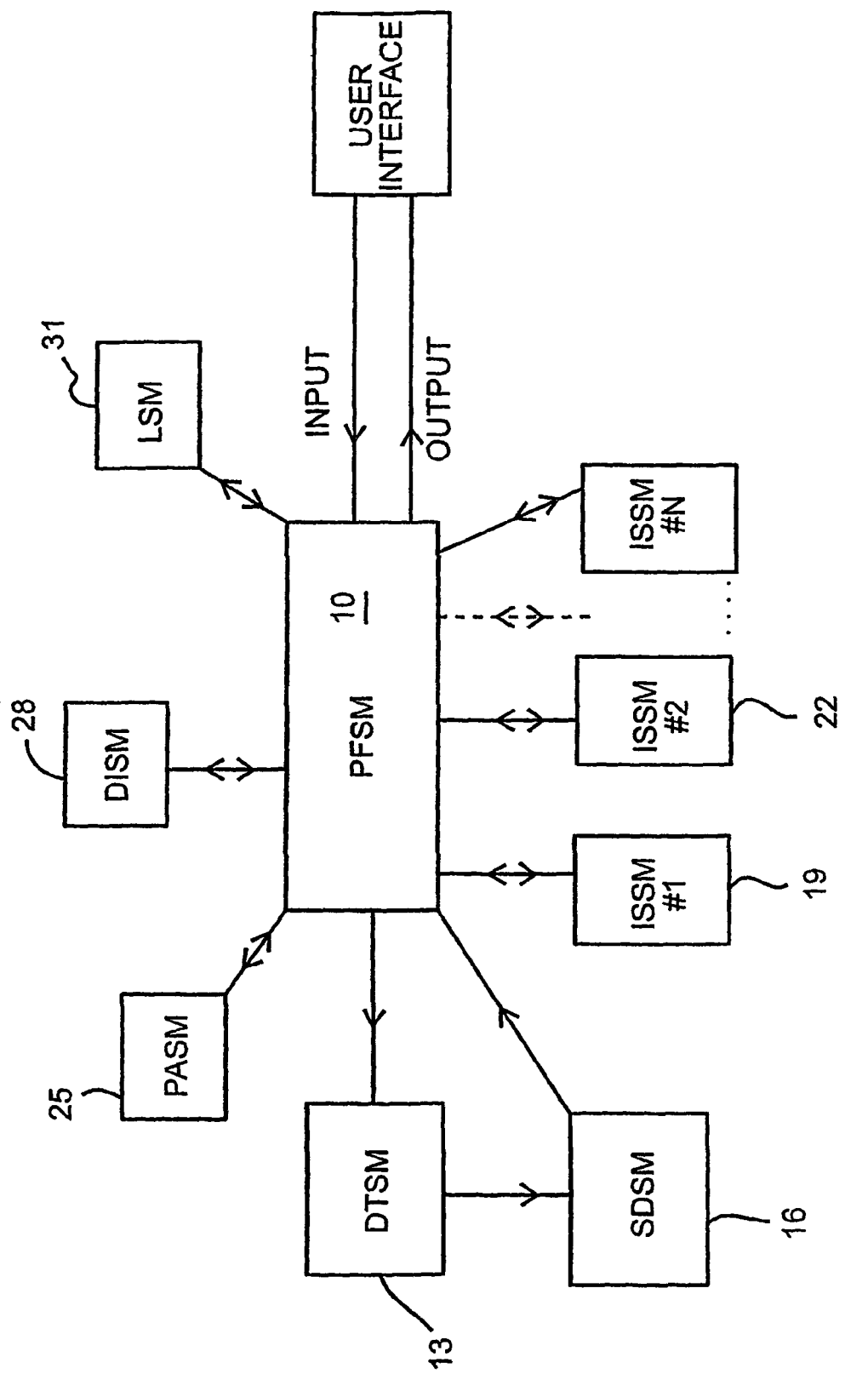
FIG. 1 is a schematic representation of software modules and their possible interaction in a system according to the invention.

The platform-framework software module 10 may have executable instructions to coordinate activities of other software modules. For example, the platform-framework software module 10 may signal the data-type software module 13 to begin identifying data-types, and may provide the data-type software module 13 with the input from the user. FIG. 1 illustrates one possible format by which the software modules may be in communication with each other. It should be noted that many other possible formats are possible.

A job of the system may be to provide the user with information corresponding to the keys pushed by the user before the user is finished entering all the key pushes needed to complete the desired entry. So, the user might push twice the key with the "2" on it, and the system might react by providing the user with information in hopes that the provided information includes the entry the user is attempting to identify. For example, the system might provide a list of phone numbers that start with "22", a list of words that start with "AB", "AC", "BA", "BC", "CA" and "CB", as well as a list of alpha-numeric information, which may include phrases like "A2, Brute?".

The data-type software module 13 may have executable instructions to identify types of data that might be returned to the user. The types of data may be selected from a list of possible types of data based on input from the user. For example, the types of data may include phone numbers, universal resource locators, names of human beings, names of locations or addresses.

The service descriptor software module 16 may include executable instructions to identify valid actions corresponding to each identified type of data. The valid actions may be selected from a list of possible actions. Valid actions may include searching a database of phone numbers, searching a database of universal resource locators, searching a database of names of human beings, searching a database of names of locations, searching a database of addresses, or searching one or more language dictionaries.

The first information-search software module 19 may include executable instructions to identify a first set of information corresponding to a first one of the identified valid actions. For example, the software module may include instructions to parse a database corresponding to a first type of data in an effort to identify information for the first set of information.

The second information-search software module 22 may include executable instructions to identify a second set of information corresponding to a second one of the identified valid actions. For example, the software module may include instructions to parse a database corresponding to a second type of data in an effort to identify information for the second set of information. From FIG. 1 it will be realized that other software modules may be provided. The number and types of software modules may be selected based on expected uses of the system.

A user interface may be provided. The user interface may be capable of providing the sets of information to the user such that the first set of information is more easily accessed by the user than the second set of information. For example, the first set of information may be listed at the top of a display and the second set of information may be listed at the bottom of a display, and a cursor may be provided at the top of the display. In that fashion, the user may find it easier to identify information in the first set of information than in the second set of information because the user will be required to move the cursor a shorter distance to identify information in the first set.

The invention may also include a platform-aware software module 25 having executable instructions to identify an environment in which the user is providing input. For example, an environment may be an internet browser, intended to enable the user to interact with the Internet. As another example, the environment may be a dialer, which may be intended for use in entering a phone number to which the user desires to be connected. In such an embodiment of the invention, the data-type software module 13 may include executable instructions to identify an environment and to select types of data based on the environment. For example, if the environment is the dialer, the data-type software module may identify phone number data types and identify a preference for phone number data types over other data types, such as words or phrases. By identifying a preference and associating that preference with a data type, the user may be provided with phone numbers in a manner that makes it easier for the user to select a desired phone number.

The invention may include a duplicate-identifier software module 28, which has executable instructions to identify duplicate information. The duplicate information may be information that appears in both the first set of information and the second set of information. The duplicate-identifier software module may also include executable instructions to remove the duplicate information from one of the sets, for example the second set of information. In this fashion, the user may be provided with shorter lists of information, and thereby make selection of a desired piece of information easier.

A system according to the invention may have the ability to learn preferences of a user. By learning those preferences, the system may configure itself so as to increase the probability that the system will provide the user with the information desired by the user. A learning software module 31 may be provided this or other purposes. The leaning module may have executable instructions to track preferences of the user and determine from the preferences whether the sets of information should be provided to the user in a particular order. For example, the user may normally use his cell phone such that words and phrases are entered more often than phone numbers, and in that situation, it may be beneficial to provide the user with words and phrases at the top of a list of information, and provide phone numbers further down the list. As such, the system may provide a set of information corresponding to words in a manner that is more easily accessed by the user than another set of information corresponding to phone numbers.

Another manner of tracking preferences may be to track how recently a piece of information was selected. The system may identify recently selected information as having a higher preference than information that has not recently been selected, and provide the recently selected information in manner that is easier to access than information that has not been recently selected.

Figure 2:
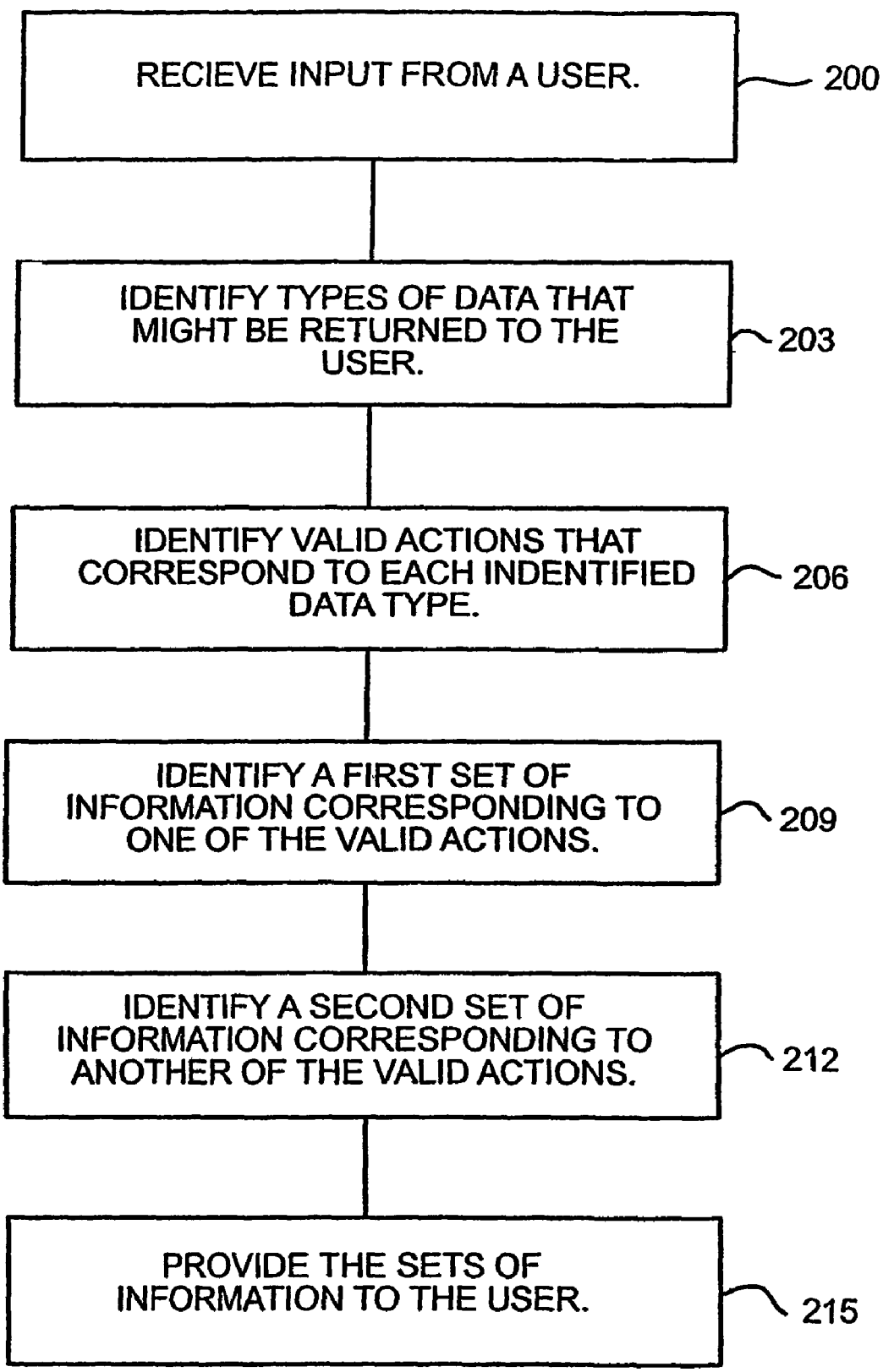
FIG. 2 is a schematic flow diagram showing steps of a method according to the invention.

The invention may be embodied as a method. FIG. 2 schematically illustrates a method according to the invention. In one such method input is received 200 from a user, and types of data that might be returned to the user are identified 203. The types of data may be selected from a list of possible types of data based on the input from the user. Examples of some of the possible types of data were given above.

Such a method may also identify 206 valid actions corresponding to each identified type of data. The valid actions may be selected from a list of possible actions. Examples of valid actions are given above. A first set of information, which corresponds to a first identified valid action, may be identified 209. For example, a database of information may be parsed to identify the first set of information. A second set of information, which corresponds to the second identified valid action, may be identified 212. For example, a database of information may be parsed to identify the second set of information. Then the sets of information may be provided 215 to the user. The first set of information may be provided 215 to the user such that it is more easily accessed by the user than the second set of information.

A method according to the invention may identify an environment in which the user is providing input. That information may be used to select types of data based on the environment. For example, environments that may be identified may include a browser, such as an Internet browser, or a dialer used to input a telephone number. By knowing the environment in which the user is providing the input, the method should be better able to provide the user with the desired information in a manner that makes the desired information easy to access. Further, by knowing the environment, the method may include a step in which the ordering of the first set of information and the second set of information is modified based on the environment. As an example, if the user pushes the key marked with "2" followed by the key marked with "2", and the method is executed so as to gather information about the environment in with those keys were pushed, the system may react differently depending on the environment. If "2" followed by "2" is pushed in a dialer environment, then the method may provide phone numbers as the first set of information and names as the second set of information. But if the environment is an Internet browser, then the method may be executed so as to provide names as the first set of information and phone numbers as the second set of information. Indicating a preference based on environment may be accomplished by identifying a preference for a first data-type over a second data-type, or by indicating a preference for information derived from a first valid action over a second valid action. A further way to indicate a preference may be to indicate a preference for information derived from the first information-search software module over information derived from the second information-search software module. Combinations of the ways of indicating a preference may also be employed.

The method may also be executed to include a step in which duplicate information is identified. The duplicate information may be information that appears in both the first set of information and the second set of information. Once identified, the duplicate information may be removed from one of the sets, for example, the second set of information. In doing so, the user may find it easier to identify desired information from a list of information.

The method may provide steps designed to track preferences of the user. If the user's preferences are known, a determination may be made as to how to provide the sets of information to the user, or how to provide particular pieces of information to the user, even if those pieces of information are in the same set. For example, a determination may be made to provide the second set of information so the user may more easily access the second set of information than the first set of information. There are many ways to track a user's preferences, and one such way is to track the frequency with which the user selects information from the sets. If a particular set of information is selected more frequently, the method may recognize that such a set is preferred, and then the method may be executed to display information from that set so it is more easily accessed by the user than information originating from other sets. Further, the method may be executed to track the frequency with which the user selects a particular piece of information from a set, and display that piece of information to the user so as to make it easier for the user to select that piece of information from other information that may be provided to the user. It should be noted that the method may be executed to organize sets of information to make selection by the user easier, the method may be executed so as to make selection of particular pieces of information easier for the user's selection, or both.

Having described systems and methods according to the invention, it should now be apparent that such systems and methods are configurable. For example, the systems and methods described above are capable of being configured to accommodate the preferences of different users, and are configurable to based on the environment in which a user is providing input. It should be noted that while many software modules may be provided in an effort to accommodate the many possible types of data and/or valid actions, not all of the software modules need be used for every input. For a particular entry, a system according to the invention utilize only some of the possible software modules.

In providing a configurable system according to the invention or executing a configurable method according to the invention, the user should find it easier to locate information desired by the user, and information should be provided to the user in many instances after executing fewer instructions than are required by prior art systems and methods. By executing fewer instructions, information may be provided to the user faster, or may be provided by using a less expensive computer, or both.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An information identification system, comprising:
   a platform-framework software module which includes executable instructions to receive input from a user, wherein the user interacts with said platform-framework in a computer environment;
   a data-type software module which includes:
      executable instructions to identify types of data that might be returned to the user, the types of data including phone numbers, universal resource locators, names of human beings, names of locations, and addresses based on input from the user, wherein the data-type software module includes executable instructions to select the types of data based on the environment, and
      executable instructions to identify an environment in which the user is providing input;
   a service-descriptor software module which includes executable instructions to identify valid actions corresponding to each identified type of data, wherein a group of possible valid actions include each of searching a database of phone numbers, searching a database of universal resource locators, searching a database of names of human beings, search a database of names of locations, and searching a database of addresses;
   a first information-search software module which includes executable instructions to identify a first set of information corresponding to a first one of the identified valid actions;
   a second information-search software module which includes executable instructions to identify a second set of information corresponding to a second one of the identified valid actions;
   a learning software module, which includes executable instructions to track preferences of the user and determine from the preferences whether data types in the sets of information provided to the user should be ordered in a manner particular to the user;
   a processor, capable of executing at least one of the software modules; and
   a user interface, capable of listing one of the first and second set of information at the top of a display and the other set of information at the bottom of the display with a cursor provided at the top of the display, so as to provide the sets of information to the user such that the set of information at the top of the display is more easily accessed by the user than the other set of information, and wherein the ordering of the first set of information and the second set of information is based on the environment, so that the system reacts differently depending upon the environment.

2. The system of claim 1, wherein the data-type software module includes executable instructions to select the types of data based on the environment.

3. The system of claim 1, wherein the executable instructions of the first information search software module include instructions to parse a database of information from which the first set of information is identified.

4. A computer-implemented method of identifying information in a computer environment, comprising
   providing a processor configured for performing the steps of:
      identifying an environment in which the user is providing input;
      receiving input from a user;
      identifying types of data that might be returned to the user, the types of data including phone numbers, universal resource locators, names of human beings, names of locations, and addresses based on input from the user, wherein the types of data are selected based on the environment;

identifying valid actions corresponding to each type of data identified, the valid actions including searching a database of phone numbers, searching a database of universal resource locators, searching a database of names of human beings, search a database of names of locations, and searching a database of addresses;

identifying a first set of information corresponding to a first one of the valid actions;

identifying a second set of information corresponding to a second one of the valid actions;

identifying duplicate information, the duplicate information being information that appears in the first set of information and the second set of information;

removing the duplicate information from the second set of information;

tracking preferences of the user and determining from the preferences whether data types in the sets of information provided to the user should be ordered in a manner particular to the user; and listing one of the first and second sets of information at the top of a display and the other set of information at the bottom of the display with a cursor provided at the top of the display, so as to provide the sets of information to the user such that the set of information at the top of the display is more easily accessed by the user than the other set of information, and wherein the ordering of the first set of information and the second set of information is based on the environment, so that the system reacts differently depending upon the environment.

5. The method of claim 4, further comprising parsing a database of information from which the first set of information is identified.

6. The method of claim 4, wherein tracking preferences is accomplished by tracking the frequency with which the user selects information from the sets.

7. The method of claim 4, wherein tracking preferences is accomplished by tracking the recently selected information from the sets.

* * * * *